June 28, 1949.  C. HOLLERITH  2,474,738
HYDRAULICALLY OPERATED BRAKE VALVE
Filed July 10, 1946
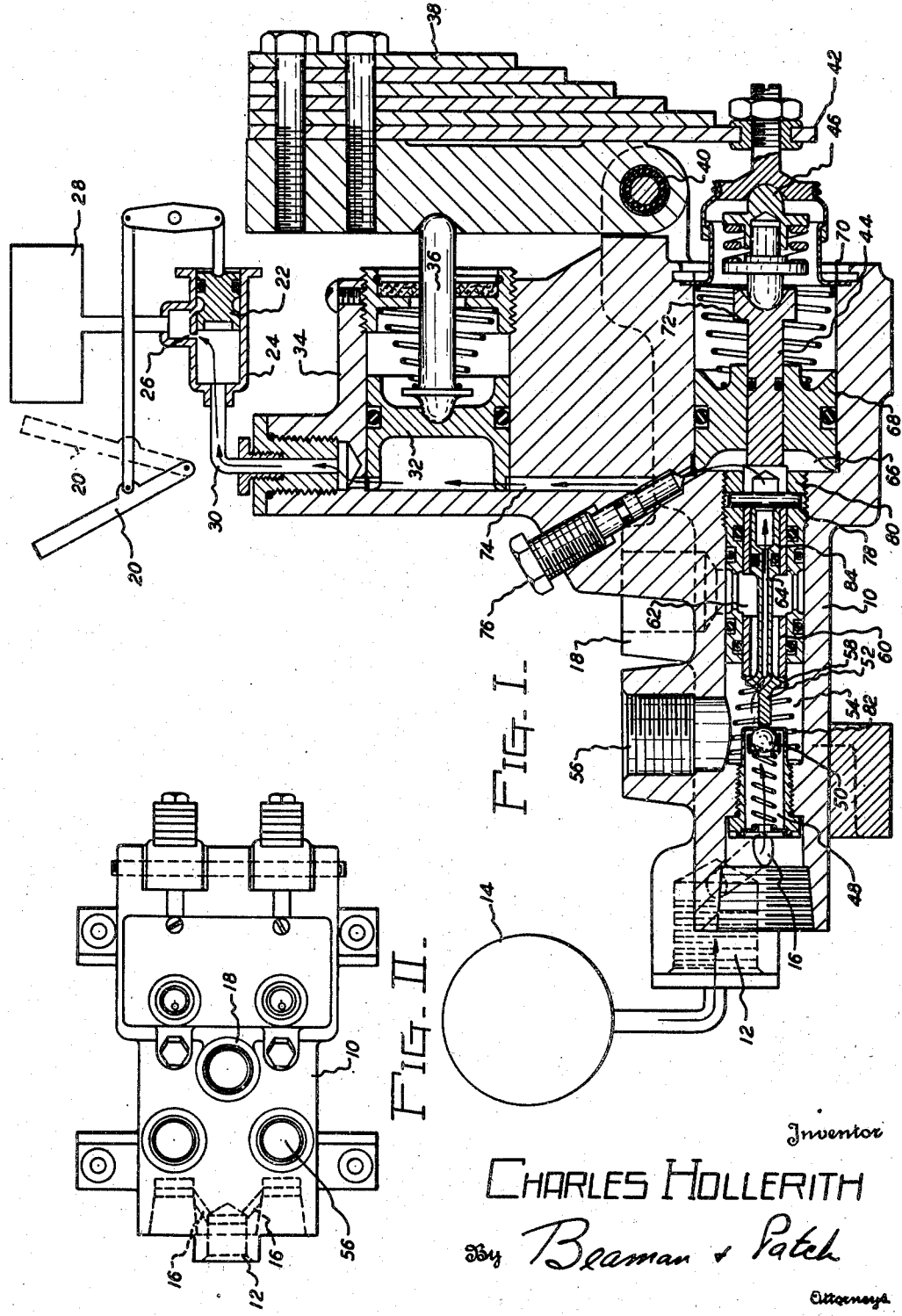
Inventor
CHARLES HOLLERITH
By Beaman & Patch
Attorneys Patented June 28, 1949

2,474,738

UNITED STATES PATENT OFFICE 2,474,738

HYDRAULICALLY OPERATED BRAKE VALVE

Charles Hollerith, Jackson, Mich., assignor, by mesne assignments, to The B. F. Goodrich Company, Akron, Ohio, a corporation of New York Application July 10, 1946, Serial No. 682,672

3 Claims. (Cl. 60—54.5)

The present invention relates to improvements in hydraulic pressure regulating systems and pressure regulating valves for aircraft, particularly designed to be used in connection with hydraulic brakes and the like.

One of the objects is to provide an improved arrangement of structure of the hydraulic actuation of regulating valves of the type described.

Another object is to provide a regulating valve of the type described having an improved bleed-through arrangement.

A further object of the invention is to provide an improved brake valve system characterized by the arrangement for bleeding air from the system.

These and other objects and advantages will more fully appear from a consideration of the following specification and the appended claims.

In the drawing,

Fig. I is a diagrammatic representation of the system with the brake valve shown in vertical cross-section, and Fig. II is a plan view of the brake valve shown in Fig. I.

Referring to the drawing, a dual valve 10 is shown having a common connection 12 with a pressure accumulator 14 and lateral passages 16 for distributing the fluid pressure to the dual valve sections which are of identical construction and operation with the return connection 18 the only other common part. Only one of the valve sections will be described.

To operate one of the valve sections of the valve 10 to apply the brakes, the brake pedal 20 is moved toward the dotted line position to displace the piston 22 in the master cylinder 24, closing the compensating port 26 leading to the supply tank 28. Continued movement of the piston 22 forces the fluid through the line 30 against the piston 32 to displace the same in a slave cylinder 34. Movement of the piston 32 is transferred through the push rod 36 to the leaf spring actuator 38 which pivots around the hinge point 40. The lower end 42 of the actuator 38 transfers its movement to the valve actuating rod 44 through a spring cushion ball-and-socket thrust unit 46.

Fluid pressure from the accumulator 14 flows through the passage 16 into the inlet chamber 48 and acts to hold the inlet valve 50 to its seat. When the valve 50 is opened by the pin portion 52, the fluid pressure then flows into the brake chamber 54 and out through the connection 56 to the brakes. Return fluid from the brakes flows through the return valve, consisting of a head 58 and a sleeve 60, into the return chamber 62, and out through the return connection 18.

The choke arrangement for synchronizing the "feel" at the pedal with brake operation takes the form of a restricted passage 64 extending between the brake chamber 54 and the displacement chamber 66 in which the piston 68 is located and urged to the position shown in Fig. I by the spring 70. When the piston 68 is sufficiently displaced to engage the shoulder 72, the delayed pressure "feel" of the brake chamber 54 against the enlarged area of the piston 68 is transferred back to the pedal 20 through the unit 46 and the associated structure. Between the chamber 66 and the cylinder 34 is a bleeder port 74 regulated by the bleeder screw 76.

The valve rod 44 engages the sliding sleeve 60 at the end which is slotted to receive the stop pin 78 mounted in the fixed outer sleeve 80. A spring 82 urges the sleeve 60 against the pin 78. Slidable in the sleeve 60 is a valve part 84 in which the restricted passage 64 is defined and of which the valve head 58 and the pin 52 may be an integral part thereof as shown in the illustrated embodiment. Movement of the rod 44 to the left, as viewed in Fig. I, first brings the left end of the sleeve 60 into engagement with the valve head 58 to close the return port leading to the return chamber 62. Continued movement of the sleeve 60 moves the valve part 84 and its associated structure to open the inlet valve 50 through displacement by the pin 52. In this manner the pressure of the accumulator 14 is directed to the brakes. To keep the return port closed it is necessary to overcome the tension of the spring 82 and the delayed pressure exerted against the piston 68.

To bleed the system described, with the bleeder screw 76 loosened and the compensating port 26 opened, the actuator 38 is manually pivoted clockwise to open the valve 50. Fluid pressure from the accumulator 14 will then flow along the path defined by the arrows shown in Fig. I, flushing the complete system and bleeding all air from the system into the supply tank 28. The bleeder screw 76 is thereafter tightened and the system is ready for operation through the pedal 20.

Manual actuation of the actuator 38 is possible by the operator applying alternate pulling and pushing forces thereto at its end remote from the hinge point 40. This produces reciprocation of the piston 32 and thereby gives rise to a kind of pumping action which causes the bled fluid to be discharged through the open port 26, the latter being maintained open during the bleeding operation.

Upon the actuator 38 being swung clockwise due to actuation of the brake pedal 20 and the consequential pressure exerted upon the actuator through the medium of the push rod 36 and its associated piston 32, the shoulder 72 will be advanced upon the piston 68 as the rod 44 is pushed to the left (as seen in Figure I) to cause the pin 52 to push against and open the inlet valve 50. During application of the brakes however the fluid pressure will build up within the chamber 66 and cause the piston to travel to the right. In so doing the condition will be obtained when this piston movement, by contact of the piston with the shoulder 72, will cause a force to be exerted upon the lower end of the actuator 38 sufficient to swing the latter anti-clockwise about the pivot 40. Such movement of the actuator will react upon the piston 32 to cause the latter to move to the left and thereby give rise to the full "load feel" effect at the depressed brake pedal 20 in the well known manner. At the same time, that is when the rod 44 is being pushed to the right to its original or starting position, the inlet valve 50 will be permitted to close under the action of its spring.

Having thus described my invention, what I claim as new and desire to cover by Letter Patent is:

1. A regulating valve for hydraulic brakes comprising a valve body having an inlet chamber adapted to be connected to a source of fluid pressure and a brake, return, and displacement chambers all in co-axial arrangement, said displacement chamber containing a movable wall adapted to be acted upon by the fluid pressure built up in said chamber to produce a piston effect, an inlet valve between said inlet and brake chambers, a restricted passage between said brake and displacement chambers, a fluid motor for actuating said inlet valve, said fluid motor comprising a cylinder, a piston in said cylinder and means operatively connecting said piston to said inlet valve, a master cylinder having a compensating port adopted to be connected to a supply tank for the pressure fluid, a conduit between said fluid motor and master cylinders, a bleeder passage between said displacement chamber and said fluid motor cylinder, adjustable valve means operatively associated with said passage to open or close the same to flow of the pressure fluid from the displacement chamber to the fluid motor cylinder, said operative connection having a manipulatable part for actuation of said inlet valve independently of said fluid motor piston to flush the system with fluid pressure from the inlet chamber via the displacement chamber and said passage in order to bleed air from the system through the master cylinder compensating port.

2. A regulating valve of the type described comprising a body having co-axial inlet, brake, return and displacement chambers, said inlet chamber being adapted for connection to a source of the hydraulic pressure medium and said displacement chamber having a movable wall adapted to be acted upon by the hydraulic pressure built up in said chamber to produce a piston effect, a restricted passageway extending between said brake and displacement chambers and providing a choked flow of the operating fluid to take place between the two chambers, an inlet valve, a fluid motor for actuating said valve, and an air bleeder passage between said motor and said displacement chamber.

3. A regulating valve mechanism comprising a body having an inlet adapted to be connected to a source of pressure liquid, and an outlet adapted to be connected to a port to be actuated by said pressure liquid, an inlet valve for controlling said inlet, means for displacing said inlet valve to admit fluid pressure from said source to said outlet, a cylinder, a piston movable in said cylinder and operatively connected to said inlet valve, said cylinder being adapted for connection with said supply source to permit the cylinder to be filled with pressure liquid therefrom so as to move said piston and thereby cause actuation of said means for displacing the inlet valve, means in hydraulic communication with said cylinder for operating the same to actuate said inlet valve, an air bleeder passage capable of having hydraulic communication with said inlet and said cylinder, adjustable valve means operatively associated with said bleeder passage to open or close the same to the flow of the pressure liquid from said inlet to said cylinder and means operable independently of said cylinder for actuating said inlet valve to permit pressure liquid from said inlet to bleed through said bleeder passage.

CHARLES HOLLERITH.

REFERENCES CITED

The following references are of record in the file of this patent:

UNITED STATES PATENTS

| Number | Name | Date |
|--------|------|------|
| 2,009,515 | Pardee | July 30, 1935 |
| 2,092,364 | Stevens | Sept. 7, 1937 |
| 2,137,954 | Sanford | Nov. 22, 1938 |
| 2,308,460 | Stelzer | Jan. 12, 1943 |
| 2,381,989 | Stelzer | Aug. 14, 1945 |